US006412763B1

(12) United States Patent
Noda et al.

(10) Patent No.: US 6,412,763 B1
(45) Date of Patent: Jul. 2, 2002

(54) ROTARY CLAMPING CYLINDER ACTUATOR

(75) Inventors: Mitsuo Noda, Ichinomiya; Yuichi Ishitani; Tadanori Sugimoto, both of Aichi-Ken, all of (JP)

(73) Assignee: Howa Machinery, Ltd., Aichi-Ken (JP)

( * ) Notice: Subject to any disclaimer, the term of this patent is extended or adjusted under 35 U.S.C. 154(b) by 0 days.

(21) Appl. No.: 09/689,412

(22) Filed: Oct. 12, 2000

(30) Foreign Application Priority Data

Nov. 26, 1999 (JP) .......................................... 11-335672

(51) Int. Cl.[7] .................................................. B23Q 3/08
(52) U.S. Cl. ........................................... 269/24; 269/32
(58) Field of Search ............................. 269/20, 24, 32, 269/25; 254/93 H; 29/252

(56) References Cited

U.S. PATENT DOCUMENTS 5,192,058 A * 3/1993 VanDalsem et al. .......... 269/24

FOREIGN PATENT DOCUMENTS

JP 60-123238 7/1985
JP 10-315083 12/1998

* cited by examiner

*Primary Examiner*—Robert C. Watson
(74) *Attorney, Agent, or Firm*—Ladas & Parry

(57) ABSTRACT

A rotary cylinder actuator has a piston rod placed in a cylinder, provided in its surface with a guide groove and capable of being moved axially between a position corresponding to a clamping angular position and a position corresponding to an unclamping angular position. A guide member is attached to the cylinder to engage in the guide groove. The piston rod turns from a first angular end position toward a second angular end position for normal turning and turns from the second angular end position toward the first angular end position for reverse turning. The opposite guide surfaces of the guide groove serve as a first guide surface for normal turning and a second guide surface for reverse turning, respectively, so that the guide member moves relative to the piston along different paths in the guide groove while the piston rod turns for normal turning and reverse turning, respectively. The first guide surface and the second guide surface are formed so that the guide member moves relative to the piston rod along a path having a shape of a section of a sine curve or a cosine curve in a final stage of movement of the piston rod, and the guide member moves relative to the piston rod so as not to produce any torque at the second angular end position.

19 Claims, 13 Drawing Sheets

ROTARY CLAMPING CYLINDER ACTUATOR

BACKGROUND OF THE INVENTION

1. Field of the Invention

The present invention relates to a rotary clamping cylinder actuator having a clamping arm attached to the free end of a piston rod connected to a piston of a hydraulic cylinder actuator and capable of turning the clamping arm between a clamping position in front of a workpiece and an unclamping position apart from the workpiece.

2. Description of the Related Art

A known clamping cylinder actuator shown in FIG. 1 of JP-B-62-5739 has a piston rod provided in its outer surface with a guide groove consisting of a helical guide section extended oblique to the axis thereof and a straight guide section continuous with the helical guide section and corresponding to a clamping angular position, and a guide member, such as a guide pin, connected to an end cover and slidably engaged with the guide groove. When a piston fitted in the cylinder bore of a cylinder and connected to the piston rod is advanced from its back end position, a clamping arm connected to the extremity of the piston rod and positioned at a clamping angular position in front of a workpiece is moved linearly away from the workpiece while the straight guide section of the guide groove moves relative to the guide member. As the piston rod is advanced further, the helical guide section of the guide groove moves relative to the guide member and thereby the clamping arm is turned to an unclamping angular position separated from the workpiece.

The unclamping angular position is determined by the position of the guide member relative to the helical guide section of the guide groove and hence the unclamping angular position is dependent on the stroke of the piston. Therefore, the clamping arm cannot be turned accurately through a predetermined angle and the clamping arm cannot be accurately turned to the unclamping angular position unless the component parts of the clamping cylinder actuator are managed properly to determine the stroke of the piston accurately. When the clamping arm clamping a workpiece is moved from the clamping angular position to the unclamping angular position, the extremity of the helical guide section comes into contact with the guide member and the inertial force of the turning clamping arm exerts intensive shocks on the guide member and the helical guide section of the guide groove, which causes the abrasion of the guide member and a portion of the piston rod corresponding to the extremity of the helical guide section and shortens the life of the clamping cylinder actuator.

When the guide member in engagement with the helical guide section comes into engagement with the straight guide section of the guide groove corresponding to the clamping angular position, the clamping arm, hence the piston rod, stops at the clamping angular position. However, it is not clear whether or not the clamping arm can be stopped accurately at the clamping angular position without exerting intensive shocks on the guide member.

Since the piston rod turns together with the piston, a sealing member (packing ring) fitted around the piston to seal the gap between the piston and the cylinder wall defining the cylinder bore exerts a resistance to the turning of the piston rod. The effect of this resistance is determined by friction between the sealing member and the cylinder wall, and the inside diameter of the cylinder bore. Therefore, the clamping arm cannot be turned unless an axial pressure high enough to turn the piston against the effect of the resistance is applied to the piston.

Accordingly, it is an object of the present invention to provide a rotary clamping cylinder actuator capable of turning a clamping arm through a fixed angle even if the stroke of a piston included therein is not controlled accurately and of reducing the effect of the inertial force of the clamping arm when stopping the clamping arm at an unclamping angular position.

A second object of the present invention is to provide an interlocking mechanism that exerts less resistance to the relative movement of interlocked members than the sliding guide mechanism interlocking a guide groove and a guide pin.

A third object of the present invention is to provide a rod turning mechanism having a rotary rod holding a turning member, such as a clamping arm, and capable of reducing the inertial force of the turning member at the opposite terminal ends of turning motion of the turning member to stop the turning member gradually and of starting turning the turning member at a high turning speed.

A fourth object of the present invention is to provide a rotary clamping cylinder actuator having a rotary member capable of turning under a low resistance and without requiring a high working pressure.

SUMMARY OF THE INVENTION

According to the present invention, a rotary clamping cylinder actuator comprises: a cylinder; a piston provided in the cylinder; a front end cover attached to a front end of the cylinder; a rotatable piston rod provided in an outer surface thereof with a guide groove and contained in the cylinder so as to project to outside through the front end cover and capable of rotating about its axis; a guide member attached to one of the cylinder and the piston and engaged in the guide groove of the piston rod so as to be movable relative to the piston rod in directions parallel to the axis of the piston rod; and a clamping arm attached to a free end of the piston rod and capable of being turned together with the piston rod between a clamping angular position and an unclamping angular position; wherein the guide groove has an oblique guide section extending oblique to the axis of the piston rod to turn the piston rod, a first straight guide section connected to one end of the oblique guide section and corresponding to the clamping angular position, and a second straight guide section connected to the other end of the oblique guide section and corresponding to the unclamping angular position, and the oblique guide section and the second straight guide section are so connected that the center of the guide member moves substantially along a circular arc when the guide member moves relative to the piston rod from the oblique guide section to the second straight guide section corresponding to the unclamping angular position.

Since the center of the guide member moves along the circular arc when the guide member moves from the oblique guide section to the second straight guide section corresponding to the unclamping angular position, the guide member is able to move very smoothly relative to the piston rod. Since the piston rod stops after moving straight instead of suddenly stopping while the same is turning, the rotational inertial force of the turning clamping arm can be reduced before the clamping arm stops at the unclamping angular position. Since the angular interval between the two stopping angular positions of the piston rod (hence the clamping arm) is dependent on the angular interval between the first and the second straight guide section, the stroke of the piston does not need to be controlled accurately and the angular interval between the two stopping angular positions can be accurately determined by properly machining the piston rod.

Preferably, the oblique guide section and the second straight guide section corresponding to the unclamping angular position of the guide groove are connected by an arcuate connecting section having the shape of a circular arc, a clamping guide surface of the oblique guide section that engages the guide member when the piston rod is thrust by a piston, and one guide surface of the second straight guide section corresponding to the unclamping angular position are connected by an arcuate connecting surface, and the center of the guide member moves along a circular arc when the guide member is guided by the arcuate connecting surface in the arcuate connecting section.

Preferably, in the arcuate connecting section, an unclamping guide surface of the oblique guide section that engages the guide member when the piston rod is thrust by a piston toward the unclamping angular position, and the other guide surface of the second straight guide section corresponding to the unclamping angular position are connected by an arcuate connecting surface, and the center of the guide member moves along a circular arc when the guide member moves relative to the piston along the arcuate connecting surface.

Since the guide surfaces on the opposite sides of the center line of the arcuate connecting section are arcuate connecting surfaces, the center of the guide member moves along a circular arc when the guide member moves relative to the piston along either of the arcuate connecting surfaces.

Preferably, the guide groove has a semicircular cross section, the guide member is a ball capable of rolling along the guide groove, and the steel ball is supported for rotation in a bearing member.

Since the ball as the guide member rolls along the guide groove, resistance to the movement of the piston rod is relatively low.

Preferably, the piston rod turns between a first angular end position and a second angular end position, the piston rod turns from the first angular end position toward the second angular end position for normal turning and turns from the second angular end position toward the first angular end position for reverse turning, the opposite guide surfaces of the guide groove serve as a first guide surface for normal turning and a second guide surface for reverse turning, respectively, and guide the guide member so that the guide member moves relative to the piston rod along different paths in the guide groove while the piston rod turns for normal turning and reverse turning, respectively, and the first guide surface for normal turning and the second guide surface for reverse turning are formed in shapes that guide the guide member so that the guide member moves relative to the piston along a path inclined to the axis of the piston rod to convert a thrust applied to the piston rod into a torque that turns the piston rod from the first angular end position toward the second angular end position, moves relative to the piston rod along a path having a shape of a section of a sine curve or a cosine curve in a final stage of movement of the piston rod, and moves relative to the piston rod so as not to produce any torque at the second angular end position.

Preferably, the first guide surface for normal turning and the second guide surface for reverse turning are so formed that the guide member moves relative to the piston rod along a path having the shape of a section of a sine curve or a cosine curve.

Preferably, the first and the second guide surface are so formed that a tangent to the sine or the cosine curve at a turning terminating point is parallel to the axis of the piston rod and a tangent to the sine or the cosine curve at a turning starting point is inclined to the axis of the piston rod.

Preferably, the guide groove is so formed that the turning starting point on the path of the guide member for normal turning is separated axially by a distance from the turning terminating point on the path of the guide member for reverse turning, and the turning terminating point on the path of the guide member for normal turning is separated axially by a distance from the turning starting point on the path of the guide member for reverse turning.

Preferably, the piston rod turns between a first angular end position and a second angular end position, the piston rod turns from the first angular end position toward the second angular end position for normal turning and turns from the second angular end position toward the first angular end position for reverse turning, the opposite guide surfaces of the guide groove serve as a first guide surface for normal turning and a second guide surface for reverse turning, respectively, so that the guide member moves relative to the piston rod along different paths in the guide groove while the piston rod turns for normal turning and reverse turning, respectively, and the first guide surface for normal turning and the second guide surface for reverse turning are formed in shapes that guide the guide member so that the guide member moves relative to the piston rod along a path inclined to the axis of the piston rod to convert a thrust applied to the piston rod into a torque at a turning starting point, the guide member moves relative to the piston along a path that decreases gradually the torque produced by the thrust applied to the piston rod and the guide member moves relative to the piston rod so as not to produce any torque at a turning terminating point.

Preferably, in the rotary clamping cylinder actuator in which one end of the cylinder is closed by the front end cover, the piston rod connected to the piston projects to outside from the front end cover and the guide member is combined with the front end cover so as to engage in the guide groove formed in the piston rod so that the piston rod turns when the same is moved axially by the piston, the piston rod is coupled with the piston so as to be turnable relative to the piston.

Preferably, a reduced portion and a shoulder are formed in the piston rod by reducing the diameter of an end portion of the piston rod, the reduced portion of the piston rod is fitted in a center bore formed in the piston, a retaining member for retaining the piston on the reduced portion of the piston rod is attached to the extremity of the reduced portion of the piston rod so that the piston is held between the shoulder of the piston rod and the retaining member with an axial gap between the piston and the shoulder of the piston rod, and the piston rod is turnable relative to the piston.

Preferably, a gap between the reduced portion of the piston rod and a wall defining the center bore of the piston is sealed with a sealing member.

Since the diameter of the connecting portion of the piston rod is smaller than that of the piston, the piston does not turn when the piston rod turns relative to the piston. Since the resistance to the turning of the piston rod is lower than that that acts on the piston rod when the piston turns together with the piston rod. Consequently, the piston rod can be turned by applying a low working pressure to the piston.

Since the guide member is a ball and the ball is supported for rotation in the bearing member, the resistance of the guide member to the turning of the piston rod is low and hence the rotary clamping cylinder actuator can be operated by further reduced working pressure.

DESCRIPTION OF THE PREFERRED EMBODIMENTS

Figure 1:
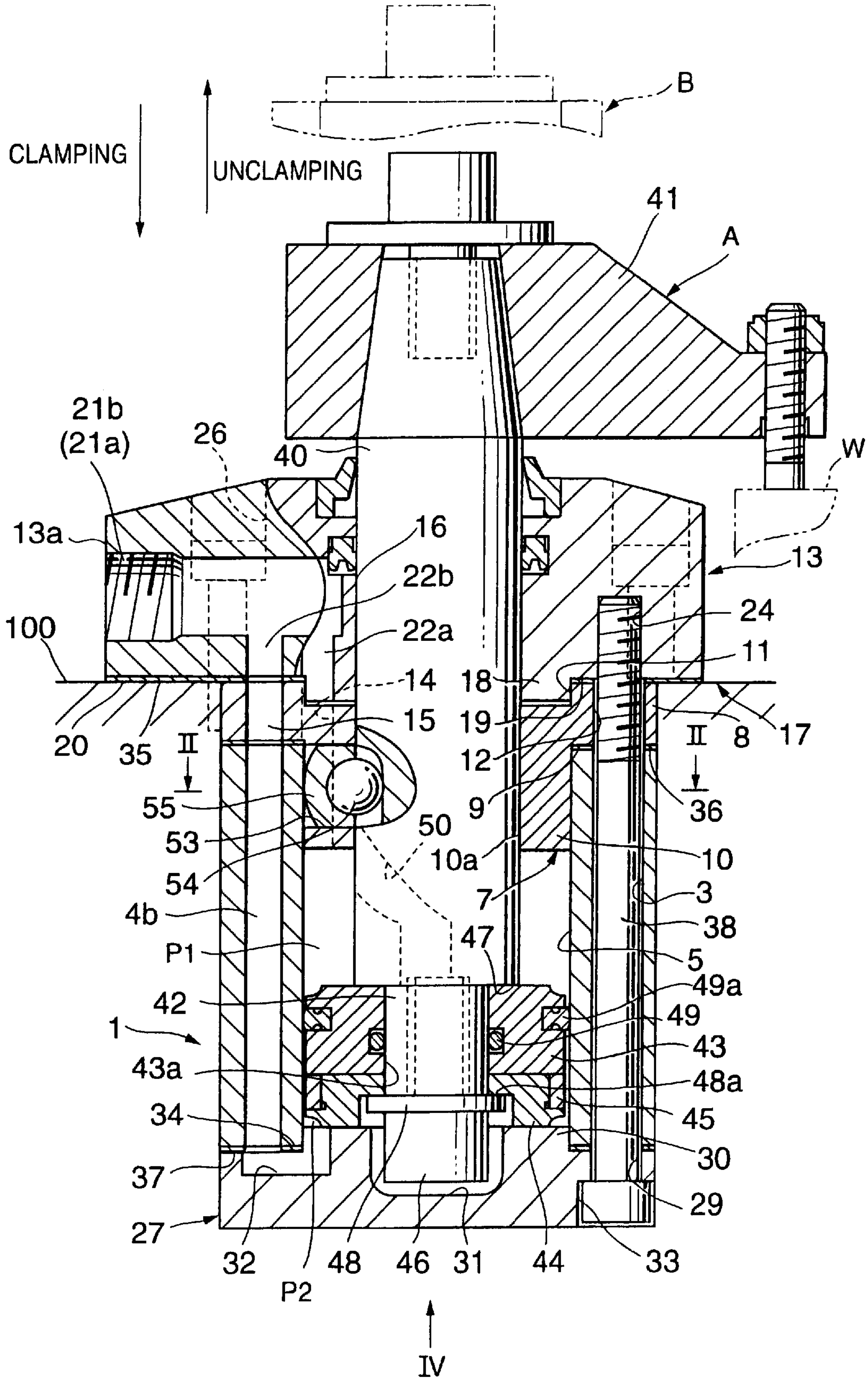
FIG. 1 is a longitudinal sectional view of a rotary clamping cylinder actuator in a first embodiment of the present invention.
Figure 2:
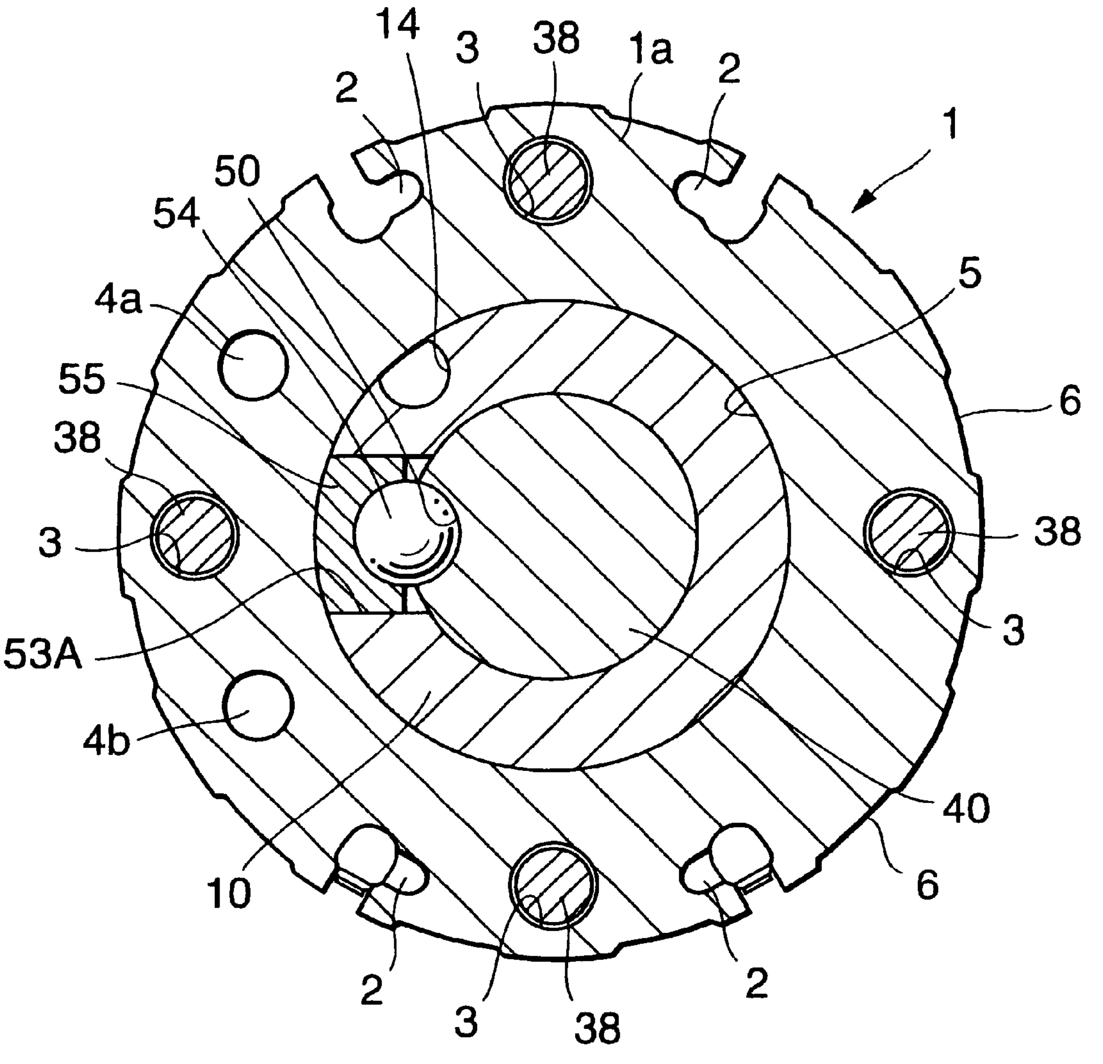
FIG. 2 is an enlarged cross-sectional view taken on line II—II in FIG. 1.

Referring to FIG. 1 showing a rotary clamping cylinder actuator in a first embodiment of the present invention, a cylinder 1 is formed from an aluminum tube formed by an extrusion process or a cold drawing process and, as shown in FIG. 2, has a side wall 1*a* defining a cylinder bore 5 and provided in its outer surface with longitudinal sensor holding grooves 2. A plurality of longitudinal through holes 3 for bolts and longitudinal holes 4*a* and 4*b* for a fluid are formed in the side wall 1*a*. When the cylinder 1 is an aluminum tube formed by an extrusion process, the cylinder bore 5 is finished in a high dimensional accuracy by a cold drawing process. Whereas the cylinder bore of a cylinder of a ferrous material or a nonmagnetic material, such as a stainless steel, must be finished by machining, the cylinder bore of a cylinder formed by a cold drawing process does not need any finishing work and hence the cylinder can be formed at low cost by a cold drawing process. The side wall 1*a* of the cylinder 1 is provided in its outer surface with a plurality of relatively wide, relatively shallow circumferential grooves 6 in addition to the sensor holding grooves 2. The grooves 6 ensures the firm grip of the cylinder 1 by the operator, reduce the area of portions of the outer surface of the cylinder 1 in a cylinder circumscribed about the cylinder 1 to make the outer surface of the cylinder 1 not subject to damaging and improve the appearance of the cylinder 1.

A guide member holder 7 has a flange 8 of an outside diameter equal to that of the cylinder 1 and a cylindrical holding part 10 projecting backward (downward, as viewed in FIG. 1) from the back surface 9 of the flange 8 and fitted in the cylinder bore 5. The flange 8 is provided in its front surface (upper surface as viewed in FIG. 1) with a shallow recess 11. The flange 8 of the guide member holder 7 is provided with through holes 12 respectively corresponding to the through holes 3 of the cylinder 1. The guide member holder 7 is provided with a connecting passage 14 for interconnecting a first connecting port 22*a* formed in a front end cover 13 and a front chamber P1 on the front side of a piston 43 fitted in the cylinder bore 5, and a connecting passage 15 for interconnecting the hole 4*b* and a second connecting port 22*b* formed in the front end cover 13.

The front end cover 13 has a hole 16 through which a piston rod 40 is extended. Since the piston rod 40 slides along the side wall of the hole 16, the front end cover 13 is formed of an abrasion-resistant ferrous material, such as a perlitic ductile cast iron. The front end cover 13 has a substantially rectangular shape radially extending beyond the peripheral boundary of the cylinder 1 and is provided on its back surface 17 with a short boss 18 fitting in the recess 11 of the flange 8 of the guide member holder 7. The boss 18 of the front end cover 13 and the cylindrical holding part 10 of the guide member holder 7 have the same outside diameter. A section of the back surface 17 facing the front end surface (upper end surface as viewed in FIG. 1) of the flange 8 of the guide member holder 7 is a sealing surface 19. A section of the back surface 17 surrounding the sealing surface 19 is a joining surface 20 flush with the sealing surface 19.

Figure 3:
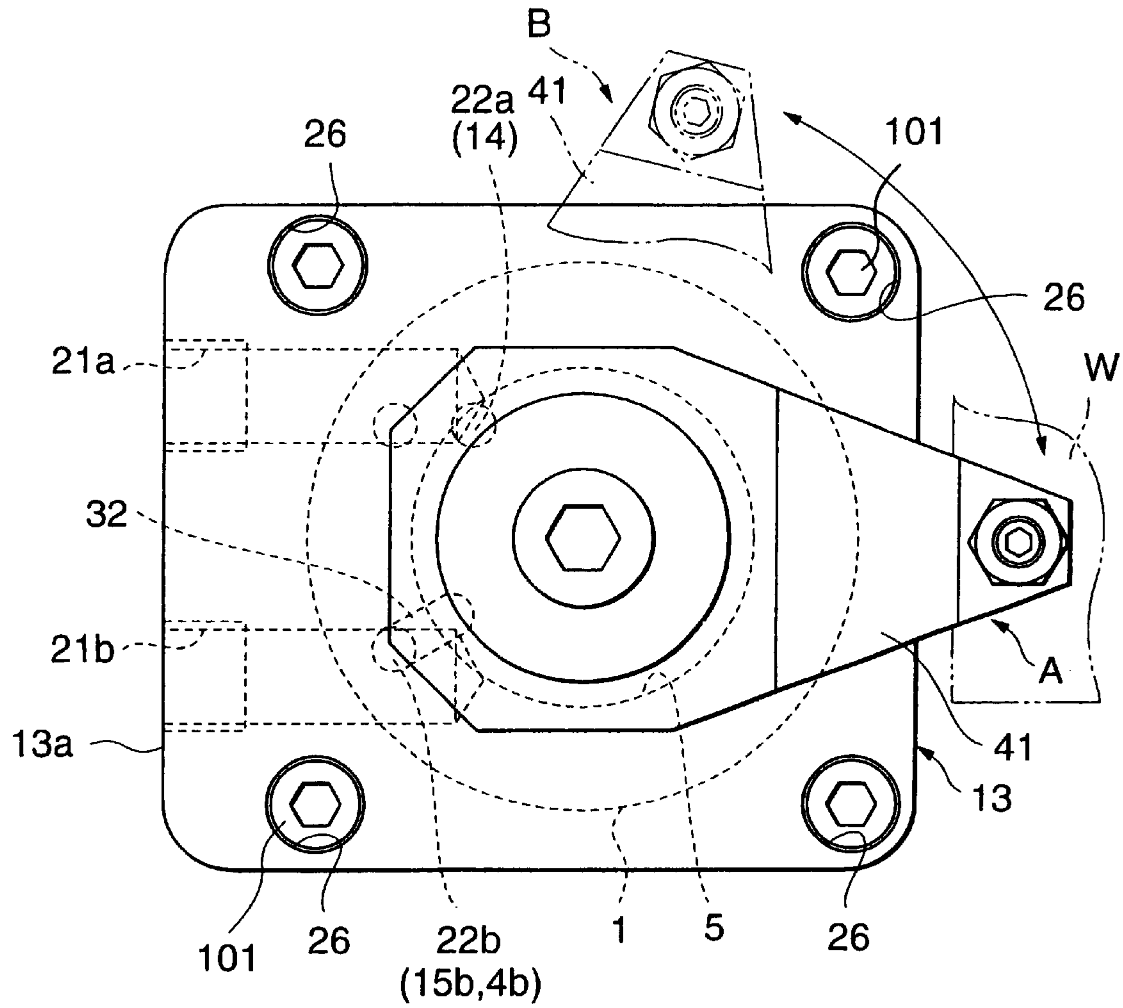
FIG. 3 is a plan view of the rotary clamping cylinder actuator shown in FIG. 1.
Figure 4:
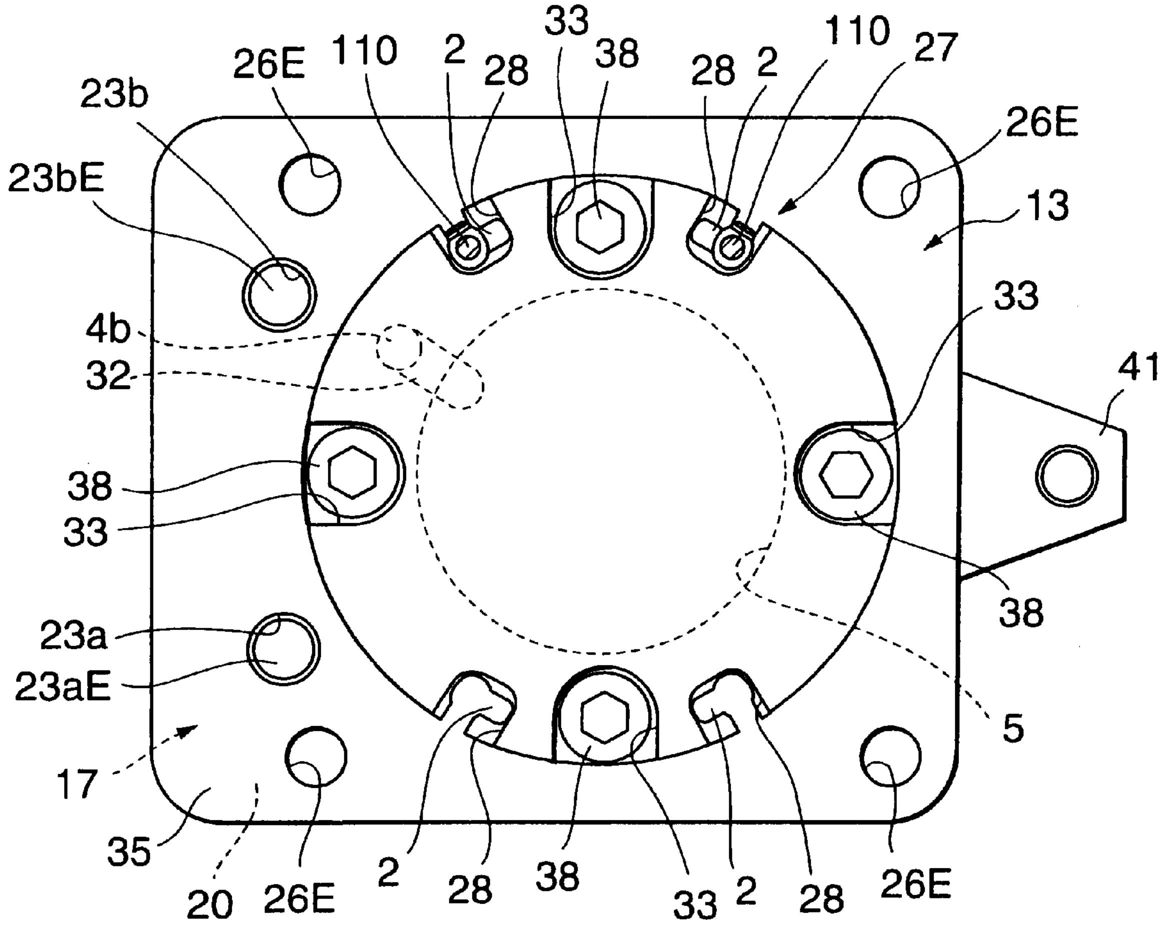
FIG. 4 is a view taken in the direction of the arrow IV in FIG. 1.

As shown in FIG. 3, a first port 21*a* and a second port 21*b* open in the side surface 13*a* of the front end cover 13. The first port 21*a* is connected to a first passage 22*a* opening in the back end surface (lower end surface as viewed in FIG. 1) of the boss 18, and the second port 21*b* is connected to a second passage 22*b* opening in the sealing surface 19. As shown in FIG. 4, ports 23*a* and 23*b* connected to the ports 21*a* and 21*b* may open in the joining surface 20. Either the ports 21*a* and 21*b* or the orts 23*a* or 23*b* may be selectively used.

The open back end (lower end as viewed in FIG. 1) of the cylinder 1 is covered with a back end cover 27. As shown in FIG. 4, the back end cover 27 is provided with grooves 28 through which sensors 110 are inserted in the sensor holding grooves 2, and holes 29 corresponding to the through holes 3 of the cylinder 1. The back end cover 27 is formed by processing a drawn aluminum block. A workpiece of a predetermined thickness is cut from the drawn aluminum block, and the workpiece is machined to form a short boss 30 that is fitted in the cylinder bore 5, a recess 31 for receiving a back end portion of the piston rod 40, a connecting groove 32 for interconnecting a back chamber P2 on the back side of the piston 43 and the hole 4*b,* and counterbores 33 formed around the rims of the through holes 29. The front surface of the back end cover 27 facing the cylinder 1 is finished in a sealing surface 34. The connecting groove 32 is formed in the boss 30 and the sealing surface 34. Each gasket is made of a thin metal (aluminum or steel) sheet sandwiched between elastic sheets made of rubber or the like.

Gaskets 35, 36 and 37 are sandwiched between the back surface 17 of the front end cover 13 and the guide member holder 7, between the guide member holder 7 and the front end of the cylinder 1 and between the back end cover 27 and the back end of the cylinder 1, respectively.

The gasket 37 sandwiched between the back end cover 27 and the cylinder 1 is provided with openings in portions thereof respectively corresponding to the sensor holding grooves 28, the through holes 29 and the connecting groove 32. The gasket 37 is fitted around the boss 30. The gasket 35 sandwiched between the front end cover 13 and the guide member holder 7 is provided with openings in its portions respectively corresponding to threaded holes 24, the second connecting passage 22*b*, the ports 23*a* and 23*b* and through holes 26. The gasket 35 is fitted on the boss 18 and extends over the sealing surface 19 and the joining surface 20. The gasket 36 sandwiched between the guide member holder 7 and the front end of the cylinder 1 is provided with openings in portions thereof respectively corresponding to the through holes 12 and the connecting passage 15.

The front end cover 13, the guide member holder 7, the cylinder 1, the back end cover 27 and the gaskets 35, 36 and 37 are arranged properly, four bolts 38 are passed through the through holes 29 of the back end cover 27, the through holes 3 of the cylinder 1 and the through holes 12 of the guide member holder 7, and the threaded end portions of the bolts 38 are screwed in the threaded holes 24 of the front end cover 13 so as to fasten those components together to complete a cylinder unit. The joints of the component members 13, 7, 1 and 27 are sealed by the gaskets 35, 36 and 37, respectively.

The piston rod 40 extends through a hole 10*a* formed in the guide member holder 7 and the hole 16 of the front end cover 13 and a front end portion of the piston rod 40 projects forward from the front end cover 13. A clamping arm 41 is fixedly mounted on the front end portion of the piston rod 40. A piston support portion 42 is formed by reducing the back end portion of the piston rod 40. The piston support portion 42 is fitted in a center bore 43*a* of the piston 43 so that the piston rod 40 is able to turn relative to the piston 43. A magnet holding member 44 is mounted rotatably on the piston support portion 42 at a position behind the piston 43 with an annular permanent magnet 45 held between the piston 43 and the magnet holding member 44. A bolt 46 is screwed in a threaded hole formed in the back end portion of the piston rod 40 to hold the piston 43 and the magnet holding member 44 between a shoulder 47 formed at the front end of the piston support portion 42 and a washer (retaining member) 48 fastened to the piston rod 40 with its front end surface 48*a* pressed against the back end of the piston rod 40 with the bolt 46. The piston 43 and the magnet holding member 44 are not pressed tight against the shoulder 47 and the piston 43 and the magnet holding member 44 are able to move slightly axially between the shoulder 47 and the washer 48. The piston 43 and the magnet holding member 44 are able to turn relative to the piston rod 40. A gap between the piston support portion 42 and the inner circumference of the piston 43 is sealed by a sealing member 49, such as an O-ring, fitted in an annular groove formed in the inner circumference of the piston 43.

Figure 5:
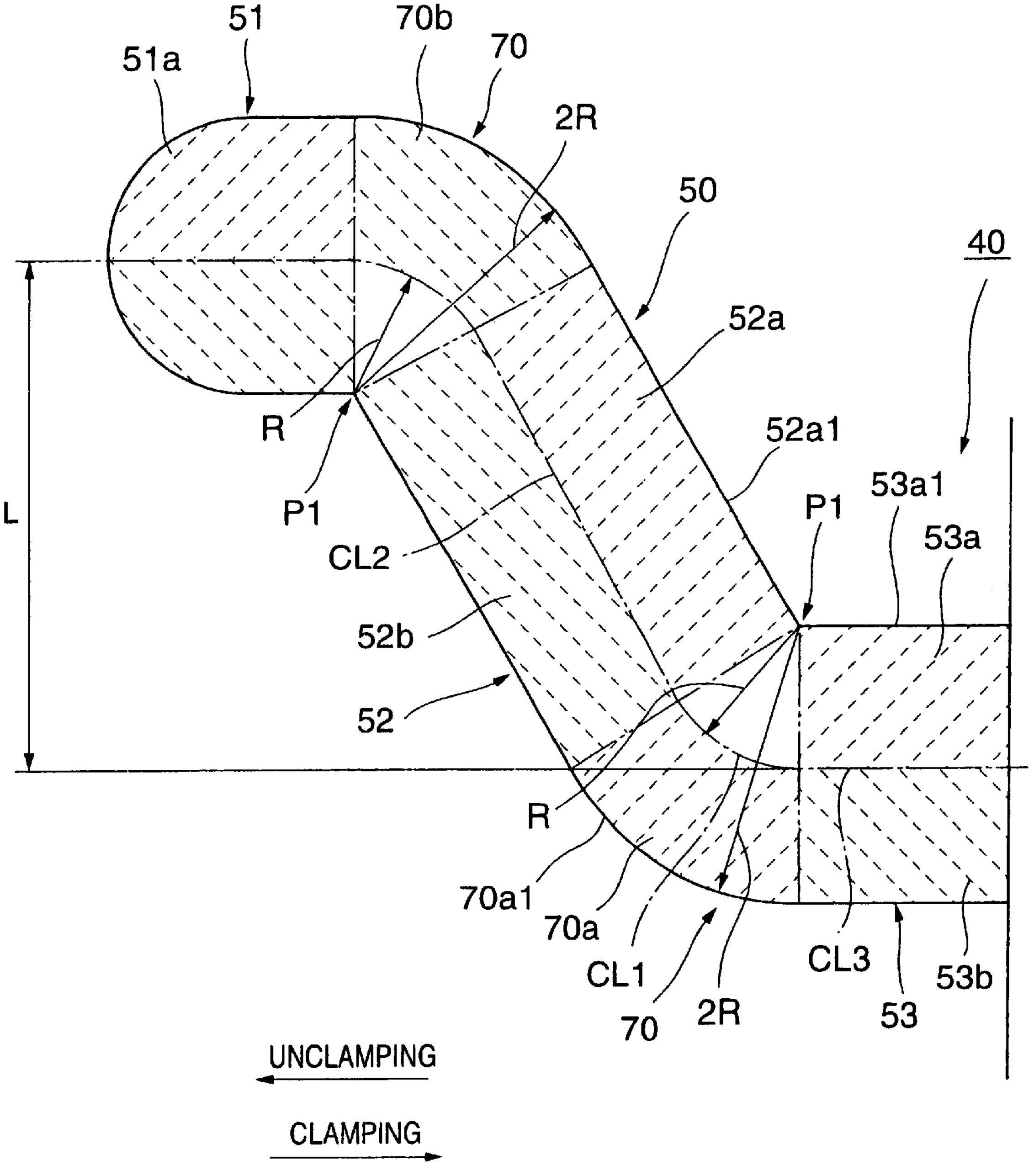
FIG. 5 is a development of a guide groove formed in a piston rod included in the rotary clamping cylinder actuator of FIG. 1.

Referring to FIGS. 1 and 5, the piston rod 40 is provided in its surface with a guide groove 50 having a semicircular cross section. The guide groove 50 consists of a first straight guide section 51, a helical or oblique guide section 52, a second straight section 53, a first curved connecting section 70 having the shape of a circular arc and connecting the first straight guide section 51 to the helical guide section 52, and a second connecting section 70 having the shape of a circular arc and connecting the second straight guide section 53 to the helical section 52. The first straight guide section 51 is formed at an angular position corresponding to an unclamping angular position B, and the second straight guide section 53 is formed at an angular position corresponding to a clamping angular position A.

When a steel ball 54 serving as a guide member moves relative to the piston rod 40 along the first straight guide section 51 or the second straight guide section 53, the piston rod 40 moves straight at the clamping angular position A or the unclamping angular position B. When the steel ball 54 moves relative to the piston rod 40 along the helical guide section 52, the piston rod 40 moves longitudinally and turns between the clamping angular position A and the unclamping angular position B.

The center line CL1 of the second curved connecting section 70 is continuous with the center line CL2 of the helical guide section 52 and the center line CL3 of the second straight guide section 53. The center line CL1 is an arc of a circle having a radius R and its center at the joint P1 of the edge line 52*a*1 of an unclamping guide surface 52*a* of the helical guide section 52 that engages the steel ball 54 when the piston rod 40 is thrust by the piston 43 toward the unclamping angular position B, and the edge line 53*a*1 of the guide surface 53*a*, i.e., a surface on the upper side of the center line CL3, of the second straight guide section 53 corresponding to the unclamping guide surface 52*a*. The radius R is equal to ½ of the width of the guide groove 50.

A curved connecting surface 70*a* of the second curved connecting section 70 interconnects a clamping guide surface 52*b* of the helical guide section 52 that engages the steel ball 54 when the piston rod 40 is thrust toward the clamping angular position A, and a guide surface 53*b* of the second straight guide section 53 corresponding to the clamping guide surface 52*b*. The edge line 70*a*1 of the curved connecting surface 70*a* is an arc of a circle having a radius 2R and its center at the joint P1. When the steel ball 54 moves relative to the piston rod 40 from the helical guide section 52 into the second straight guide section 53, the curved connecting surface 70*a* guides the steel ball 54 so that the center of the steel ball 54 moves along the center line CL1 of the second curved connecting section 70.

Similarly, the helical guide section 52 and the first straight guide section 51 corresponding to the clamping angular position A are connected by the first curved connecting section 70. The unclamping guide surface 52*a* that engages the steel ball 54 when the piston rod 40 is thrust toward the unclamping angular position B, and the guide surface 51*a* of the first straight guide section 51 are interconnected by a curved connecting surface 70*b* which is the same as the curved connecting surface 70*a*. Thus, the center of the steel ball 54 moves along the curved path having the shape of a circular arc when the steel ball 54 moves from the helical guide section 52 into the first straight guide section 51 corresponding to the clamping position A or the second straight guide section 53 corresponding to the unclamping position B.

The cylindrical holding part 10 of the guide member holder 7 is provided with a radial hole 53A (FIG. 2). A bronze bearing member 55 for supporting the steel ball 54 for rolling is fitted in the radial hole 53A so that the steel ball engages in the guide groove 50. When the piston 43 moves forward from its back end position shown in FIG. 1 toward its front end position to move the piston rod 40 forward, the steel ball 54 moves relative to the piston rod 40. In an initial stage of the forward movement of the piston 43, the piston rod 40 holding the clamping arm 41 moves straight forward slightly. In a middle stage of the axial movement of the piston 43, the piston rod 40 moves forward and turns from an angular position corresponding to the clamping angular position A to an angular position corresponding to the unclamping angular position B, as shown in FIG. 3. In a final stage of the forward movement of the piston 43, the piston rod 40 moves straight forward slightly at an angular position corresponding to the unclamping angular position B. When the piston 43 moves backward from the front end position toward the back end position, the foregoing steps of movement of the piston rod 40 are reversed.

The front end cover 13 and the back end cover 27 are fastened to the front and the back end of the cylinder 1 with the bolts 38 passed from the side of the back end cover 27 through the cylinder 1 and screwed in the threaded holes 24 of the front end cover 13. The number of the bolts 38 may be small. Since the threaded holes 24 of the front end cover 13 are not through holes, the threaded holes 24 are not clogged with chips produced by machining even if the rotary clamping cylinder actuator is used in a vertical position with the front end cover 13 facing upward. Since the bolts 38 are extended through the through holes 3 of the cylinder 1 and the through holes 12 of the guide member holder 7 and are concealed, the rotary clamping cylinder actuator has a satisfactory appearance. The cylinder 1 is formed from a cylindrical aluminum shape originally provided with the through holes 3 in its side wall, any machining process for forming the through holes 3 is unnecessary and the cylinder 1 can be readily obtained by simply cutting the cylindrical aluminum shape in a desired length. The back end cover 27 can be easily made simply by machining an aluminum shape originally provided with the sensor holding grooves 28 and the through holes 29.

The front end cover 13 of the rotary clamping cylinder actuator is fastened to a fixed member 100 of a machine or a jig base with bolts 101 (FIG. 3) passed through the through holes 26. The gasket 35 extended over the joining surface 20 of the front end cover 13 is sandwiched between the front end cover 13 and the fixed member 100. When a workpiece or a pallet is clamped by the clamping arm 41 of the rotary clamping cylinder actuator to machine the workpiece by a machine tool, the loosening of the bolts 101 can be prevented even if the rotary clamping cylinder actuator is vibrated because the gasket is elastic. Thus, the rotary clamping cylinder actuator clamps the workpiece with reliability. Since the back surface 17 of the front end cover 13 is covered with the gasket 35, gaps between the ports opening in the back surface 17 and the fixed member 100 do not need to be sealed by O-rings.

Figure 6A:
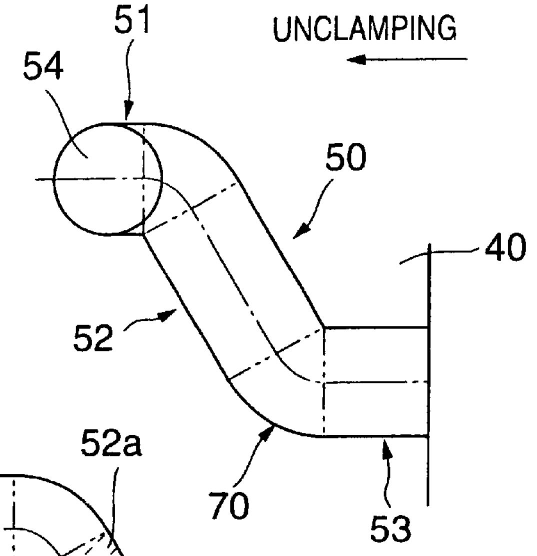
FIGS. 6A to 6D are diagrammatic views for explaining actions of the rotary clamping cylinder actuator shown in FIG. 1.

The operation of the rotary clamping cylinder actuator will be described. When the rotary clamping cylinder actuator is in a clamping state shown in FIG. 1, the steel ball 54 is in the first straight guide section 51 of the guide groove 50 as shown in FIG. 6A. A working fluid is supplied into the back chamber P2 through the second port 21*b*, the second connecting port 22*b*, the connecting passage 15, the hole 4*b* and the connecting groove 32. Then, the piston 43 supported on the piston rod 40 moves forward (to the left as viewed in FIG. 6A) and the piston rod 40 holding the clamping arm 41 clamping a workpiece W moves slightly forward as the first straight guide section 51 moves relative to the steel ball 54.

Figure 6B:
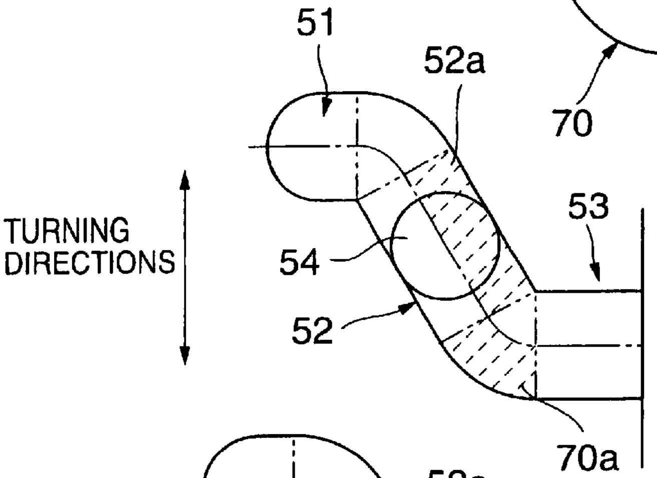

As the piston 43 continues moving forward, the steel ball 54 moves relative to the piston rod 40 along the unclamping guide surface 52*a* of the helical guide section 52 as shown in FIG. 6B. Consequently, the piston rod 40 advances and turns from an angular position corresponding to the clamping angular position A toward an angular position corresponding to the unclamping angular position B, the clamping arm 41 is turned from the clamping angular position A toward the unclamping angular position B. After the piston rod 40 has arrived at the angular position corresponding to the unclamping angular position B, the clamping arm 41 exerts a rotational inertial force on the piston rod 40 and the curved connecting surface 70*a* is pressed against the steel ball 54. Thus, the steel ball 54 is guided smoothly by the curved connecting surface having the shape of a circular arc into the second straight guide section 53 corresponding to the unclamping angular position B.

Figure 6C:
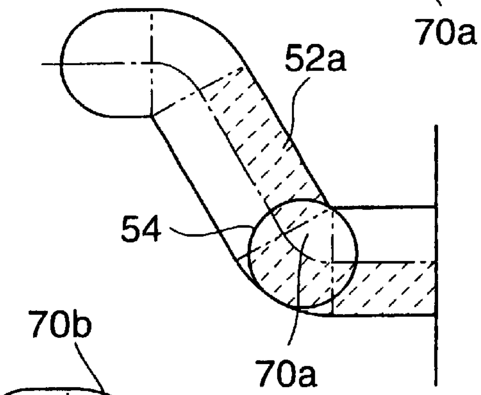
Figure 6D:
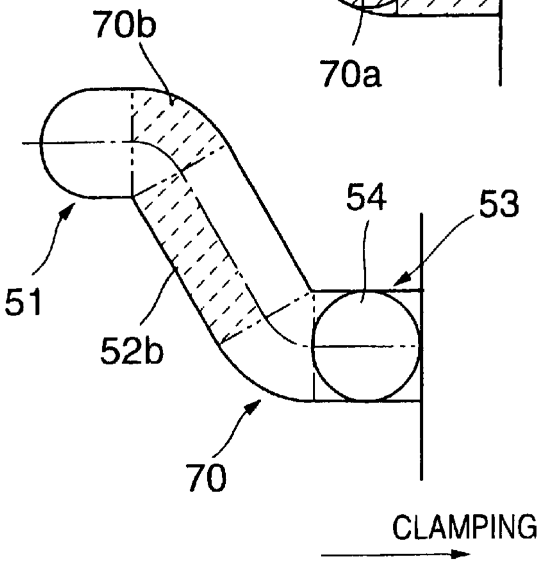

Consequently, the piston rod 40 stops the turning and moves straight forward slightly as shown in FIGS. 6C and 6D at the angular position corresponding to the unclamping angular position B. Since the clamping arm 41 is moved straight forward after the same has been turned from the clamping angular position A to the unclamping angular position B and has been gradually stopped turning, the effect of the rotational inertial force of the clamping arm 41 on the steel balls 54 and the guide groove 50 can be moderated. The angle of turning of the piston rod 40, hence that of the clamping arm 41, is determined by the angular interval L between the straight guide sections 51 and 53 (FIG. 5). The angular interval L can be accurately determined by accurately machining the piston rod 40 to form the guide groove 50. Therefore, even if the rotary clamping cylinder actuator is assembled with an error in the stroke of the piston 43, the angular interval L between the clamping angular position A and the unclamping angular position B remains unchanged.

In an unclamping state shown in FIG. 6D, the working fluid is supplied through the first port 21*a*, the first connecting passage 22*a* and the connecting passage 14 into the front chamber P1. Then, the foregoing unclamping steps of the rotary clamping cylinder actuator are reversed to turn the clamping arm 41 from the unclamping angular position B to the clamping angular position A. As the piston 43 continues moving backward, the steel ball 54 moves relative to the piston rod 40 along the clamping guide surface 52*b* of the helical guide section 52. Consequently, the piston rod 40 moves backward and turns from the angular position corresponding to the unclamping angular position B toward the angular position corresponding to the clamping angular position A. After the piston rod 40 has arrived at the angular position corresponding to the clamping angular position A, the clamping arm 41 exerts a rotational inertial force on the piston rod 40 and the curved connecting surface 70*b* is pressed against the steel ball 54. Thus, the steel ball 545 is guided smoothly by the curved connecting surface 70*b* having the shape of a circular arc into the first straight guide section 51 corresponding to the clamping angular position A. Thus, the effect of the rotational inertial force of the clamping arm 41 on the piston rod 40 and the steel ball 54 can be moderated.

Since the steel ball 54 is supported for rolling by the bronze bearing member 55, rolling resistance to the steel ball 54 rolling along the guide groove 50 is very low, and hence the piston 43 can be moved by a low working pressure of the working fluid. The piston rod 40 can be turned relative to the piston 43 by the cooperative agency of the steel ball 54 and the guide groove 50. Since the distance between the axis of the piston rod 40 and the outer circumference of the piston 43 is greater than that between the axis of the piston rod 40 and the inner circumference of the piston 43, a torque produced by the resistance of the sealing member 49*a* to the turning of the piston 43 relative to the cylinder 1 is greater than that produced by the resistance of the sealing member 49 to the turning of the piston support part 42 of the piston rod 40 relative to the piston 43. Therefore, the piston rod 40 turns relative to the piston 43 while the piston 43 does not turn relative to the cylinder, and hence a thrust to be applied to the piston rod 40 to turn the piston rod 40 is smaller than that necessary for turning the piston rod that turns together with the piston.

Figure 7A:
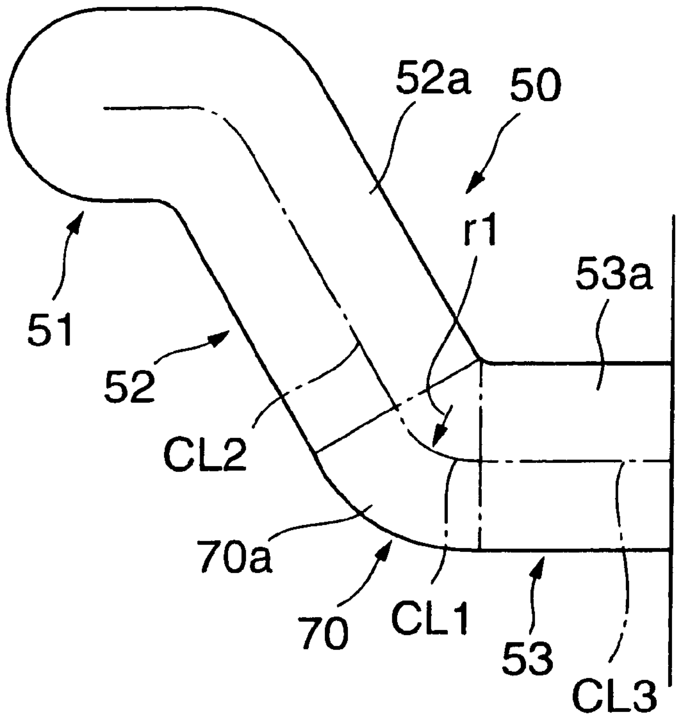
FIGS. 7A and 7B are diagrammatic views of modifications of the guide groove shown in FIG. 5.
Figure 7B:
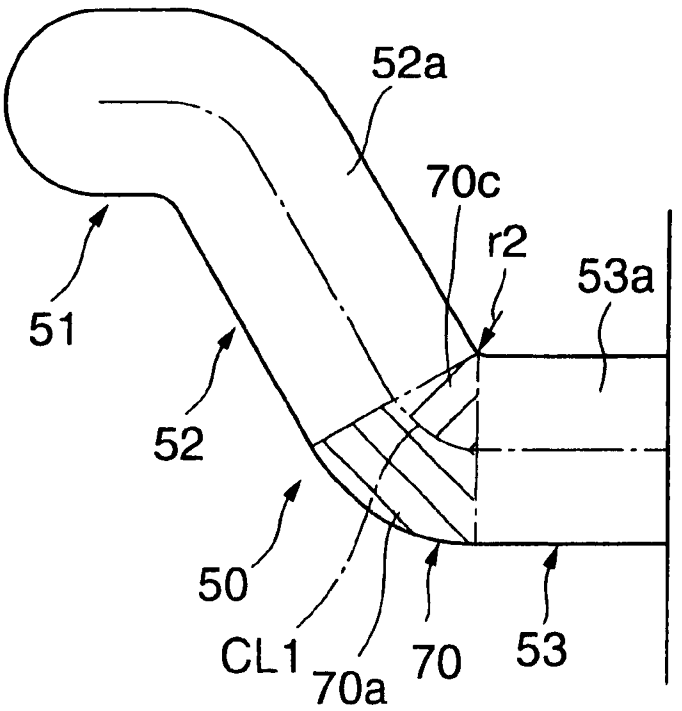

The center line CL1 of each of the curved connecting sections 70 of the guide groove 50 of the piston rod 40 in this embodiment is an arc of the circle having the radius R equal to ½ of the width of the guide groove 50. The center line CL1 may be an arc of a circle having a radius r1 smaller than the width of the guide groove 50 as shown in FIG. 7A. When the unclamping guide surface 52*a* of the helical guide section 52 and the guide surface 53*a* of the second straight guide section 53 corresponding to the unclamping angular position B is connected by a curved connecting surface 70*c* (surface on the upper side of the center line CL1 in FIG. 7B) having an edge line of the shape of an arc of a circle having a small radius r2, and the center of the steel ball 54 moves along a circular arc when the steel ball 54 rolls along the curved connecting surface 70*c,* the steel ball 54 is able to move along the curved connecting surface 70*c* and the center of the steel ball 54 is able to move along the circular arc even if the piston rod 40 cannot be turned by the inertial force of a light clamping arm in the final stage of turning of the clamping arm and the steel ball 54 cannot be guided by the curved connecting surface 70*a.* The guide groove having the shape shown in FIG. 7B is applicable to a clamping cylinder actuator having a clamping arm that does not move axially and only turns as disclosed in JP-B-62-5739.

The magnetic sensors 110 are held in the sensor holding grooves 2 respectively corresponding to the position of the magnet 45 held on the piston 43 when the clamping arm 41 is at the clamping angular position A to clamp the workpiece W and the position of the magnet 45 when the clamping arm 41 is at the unclamping angular position B. One of the magnetic sensors 110 detects the presence of the clamping arm 41 at the clamping angular position A as shown in FIG. 1 to clamp the workpiece W and the other detects the presence of the clamping arm 41 at the unclamping angular position B to release the workpiece W. Since the magnet 45 supported on the piston rod 40 is spaced a long distance apart from the front end cover 13 made of a ferrous material, the intensity of a magnetic field created by the magnet 45 is not reduced by the front end cover 13 and hence the magnetic sensors 110 are able to detect the presence of the clamping arm 41 at the clamping angular position A and at the unclamping angular position B.

Figure 8:
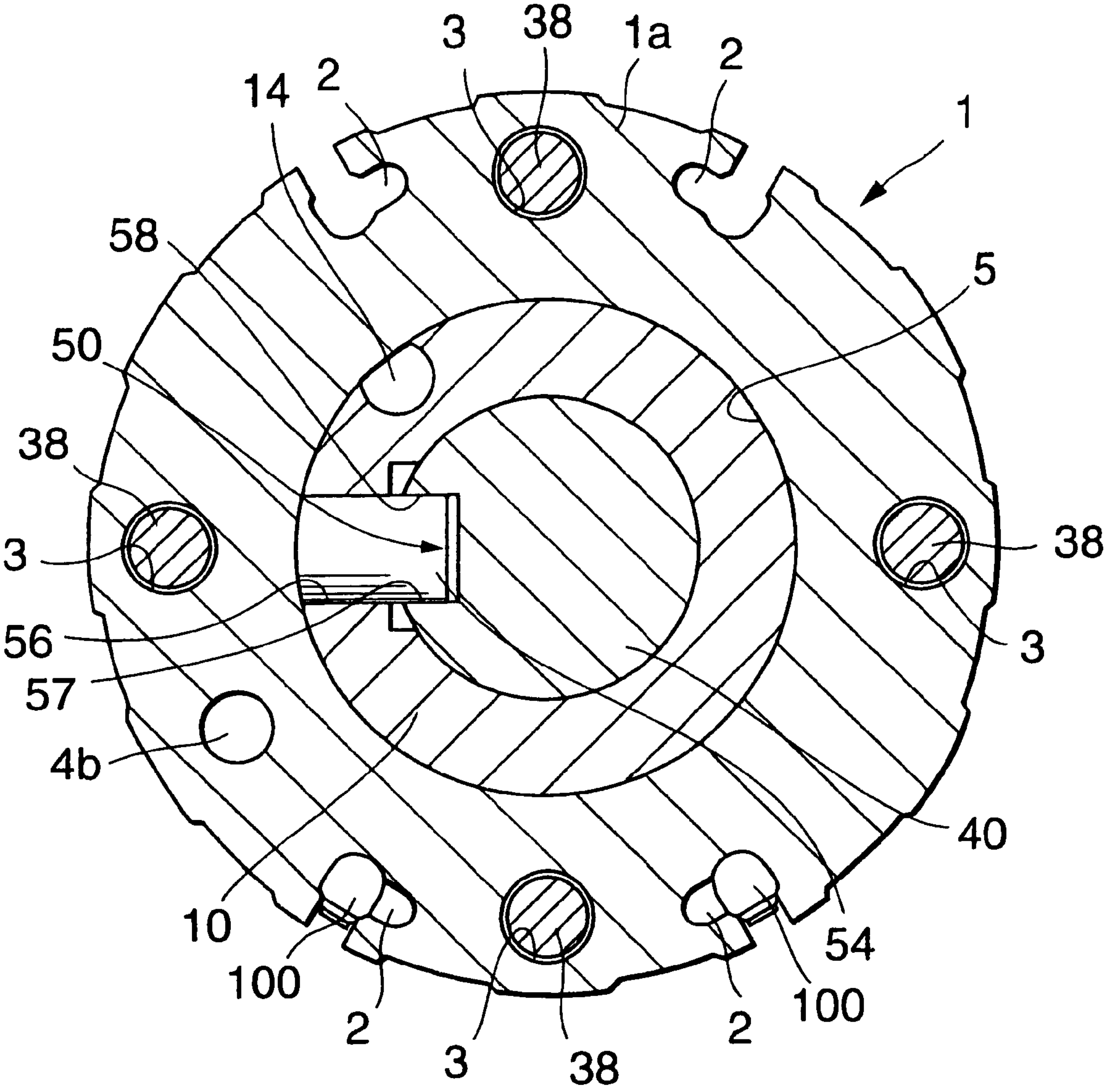
FIG. 8 is a cross-sectional view of a rotary clamping cylinder actuator in a second embodiment of the present invention.
Figure 9:
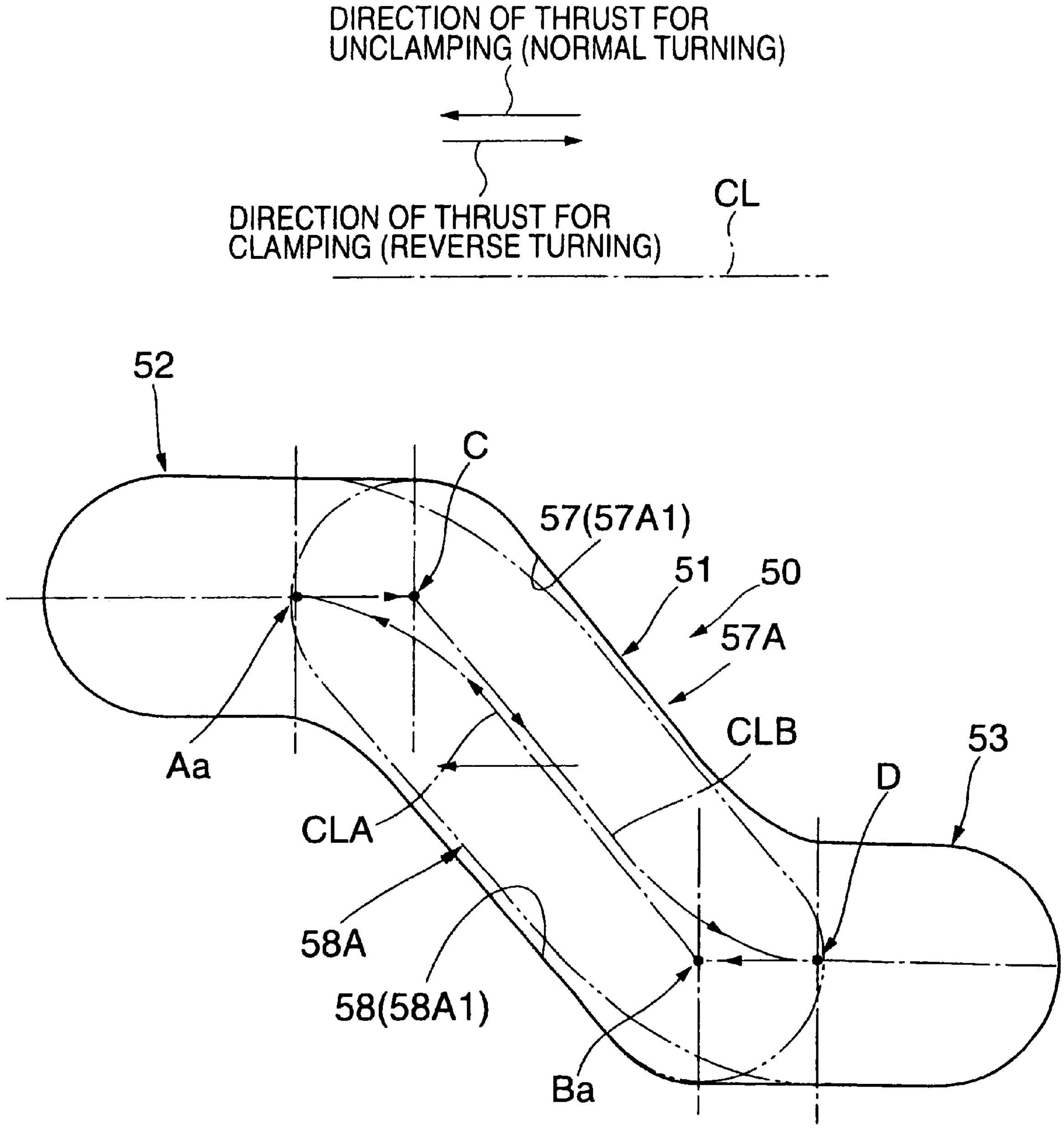
FIG. 9 is a development of a guide groove employed in the rotary clamping cylinder shown in FIG. 8.

A rotary clamping cylinder actuator in a second embodiment according to the present invention will be described with reference to FIGS. 8 to 14, in which parts like or corresponding to those of the rotary clamping cylinder actuator are denoted by the same reference characters and description thereof will be omitted. Referring to FIG. 8, a piston rod 40 is provided in its surface with a guide groove 50 as shown in FIG. 9 having a U-shaped cross section. The guide groove 50 has a helical or oblique guide section 51 extending at an angle to the axis CL of the piston rod 40 to turn the piston rod 40, a first straight guide section 52 for guiding the piston rod 40 for straight movement corresponding to a clamping angular position A (first end of turning) and connected to one end of the helical guide section 51, and a second straight guide section 53 for guiding the piston rod 40 for straight movement corresponding to an unclamping angular position B (second end of turning) and connected to the other end of the helical guide section 51.

The guide groove 50 has opposite guide surfaces, i.e., an unclamping guide surface 57 that engages a guide pin 54 when the piston rod 40 is turned in a normal direction for unclamping and a clamping guide surface 58 that engages the guide pin 54 when the piston rod 40 is turned in a reverse direction for clamping.

Figure 10:
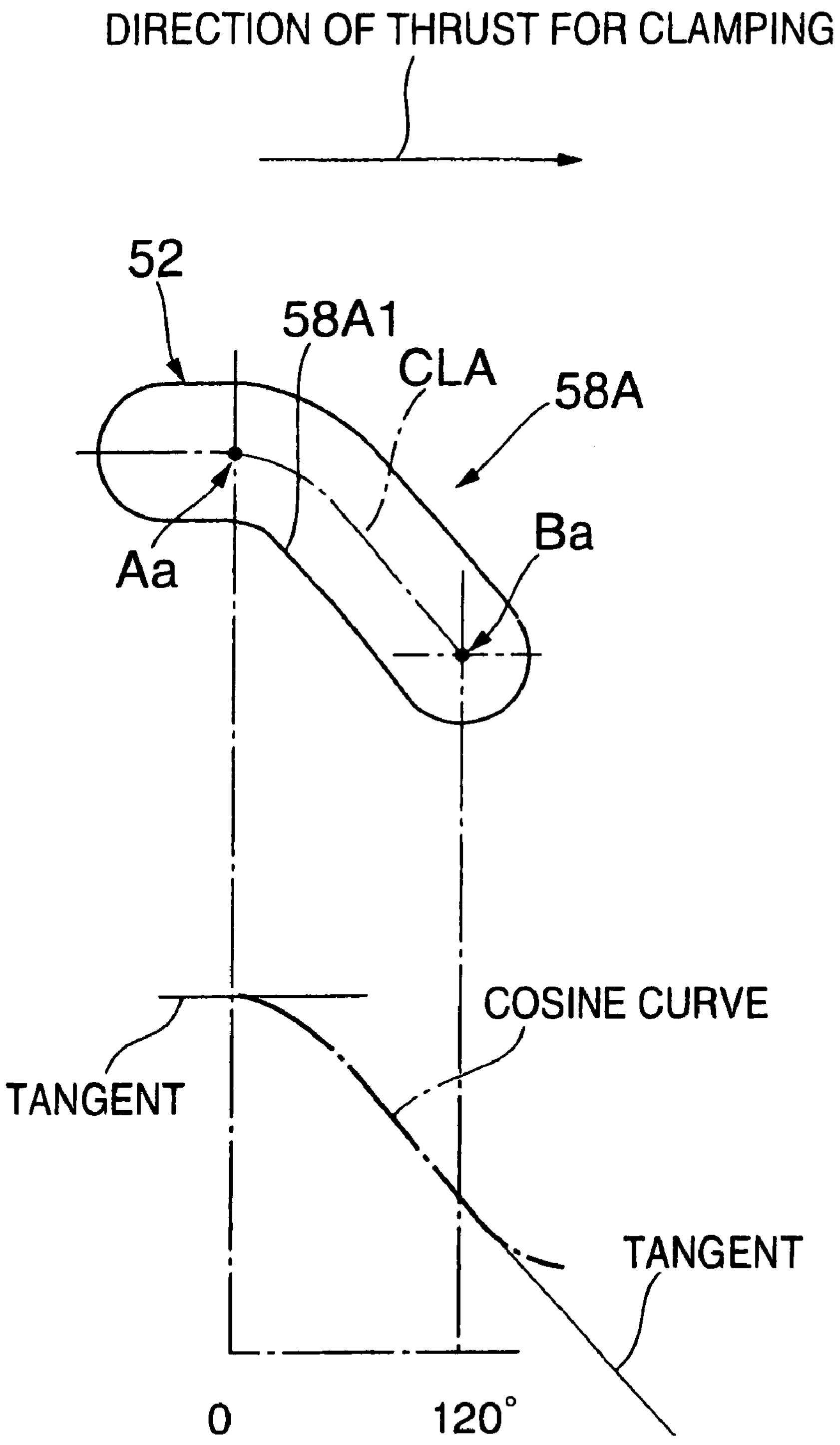
FIG. 10 is diagrammatic view for explaining a section of a guide groove.

A back surface 58A1 of a clamping guide section 58A, with respect to the direction of thrust that causes the piston rod 40 to turn in the reverse direction is used as the clamping guide surface 58. The clamping guide section 58A is formed so that its center line CLA is a section of a cosine curve in the angular range of 0° to 120° as shown in FIG. 10. A turning terminating point Aa corresponding to the clamping angular position A on the center line CLA, corresponds to a point on the cosine curve corresponding to an angle of 0° so that a tangent to the center line CLA at the turning terminating point Aa coincides with the direction of thrust. Therefore, an axial force applied to the piston rod 40 by the guide pin 54 at the turning terminating point Aa does not produce any torque. A section of a path between a turning starting point Ba corresponding to the unclamping angular position B and a middle point is a section of the cosine curve, tangents to which are inclined to the direction of thrust. Therefore, a thrust applied to the piston rod 40 by the guide pin 54 at a point on the path between the turning starting point Ba and the middle point is converted into a torque.

Figure 11:
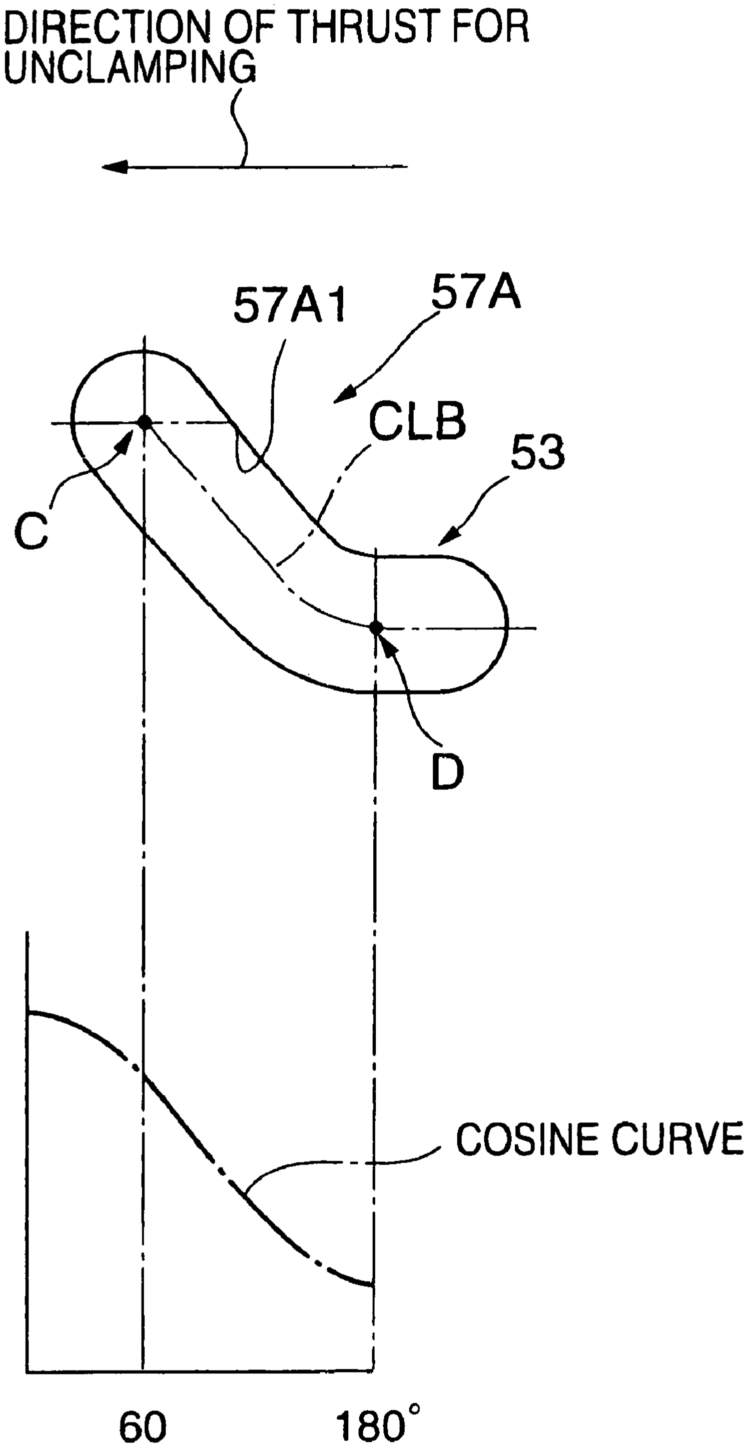
FIG. 11 is diagrammatic view for explaining a section of a guide groove.

As shown in FIG. 11, a back surface 57A1 of an unclamping guide section 57A, with respect to the direction of thrust that causes the piston rod 40 to turn in the normal direction, is used as the unclamping guide surface 57. The unclamping guide section 57A and the clamping guide section 58A are symmetrical with respect to an optional point. The center line CLB of the unclamping guide section 57A is a section of a cosine curve in the range of 60° to 180°.

As shown in FIG. 9, in the guide groove 50 formed by combining the unclamping guide section 57A and the clamping guide section 58A, the turning starting end C of the center line CLB of the unclamping guide section 57A and the turning terminating end Aa of the center line CLA of the clamping guide section 58A are axially spaced apart, and the turning terminating end D of the center line CLB of the unclamping guide section 57A and the turning starting end Ba of the center line CLA of the clamping guide section 58A are axially spaced apart. When guided by the unclamping guide surface 57 (57A1), the guide pin 54 moves along a path corresponding to the center line CLB. When guided by the clamping guide surface 58 (58A1), the guide pin 54 moves along a path corresponding to the center line CLA.

As shown in FIG. 8, a guide member holder 7 has a holding part 10 provided with a radial hole 56, and the guide pin 54 is fitted in the radial hole 56.

Figure 12A:
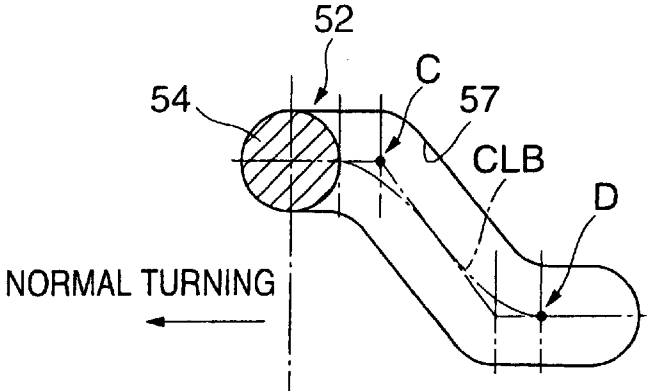
FIGS. 12A to 12D are is a diagrammatic views for explaining actions of the rotary clamping cylinder actuator shown in FIG. 8.
Figure 12B:
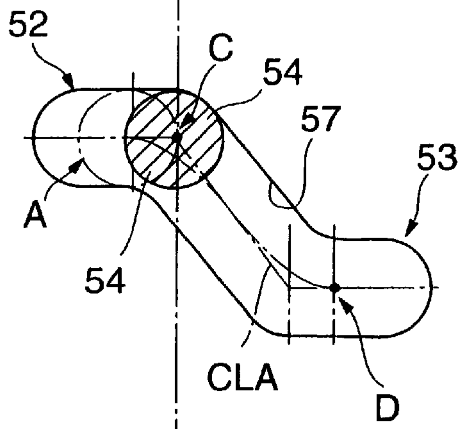
Figure 12C:
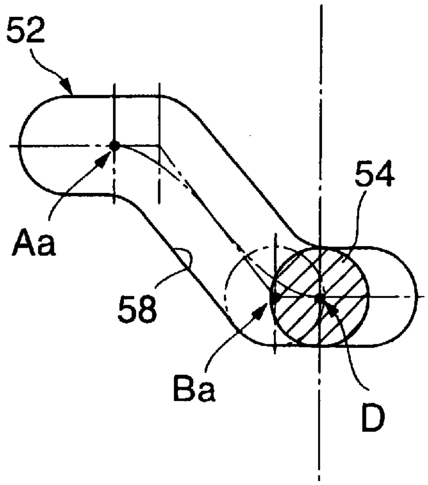
Figure 14:
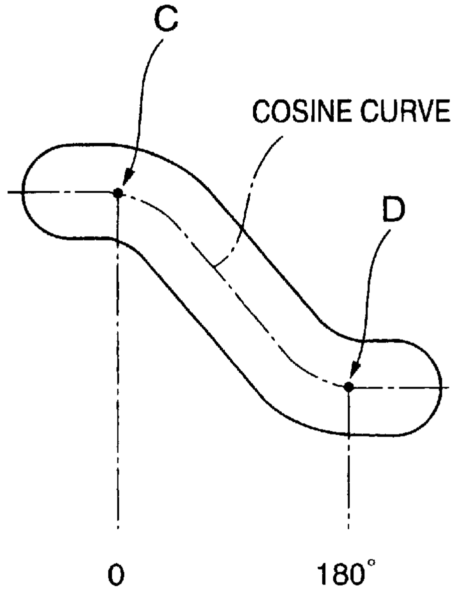
FIG. 14 is a diagrammatic view explaining effects of the present invention.

The operation of the rotary clamping cylinder actuator will be described on an assumption that a thrust is greater than an inertial force produced by the turning clamping arm 41. When the clamping arm 41 is at the clamping angular position A, the guide pin 54 is at the extremity of the first straight guide section 52 of the guide groove 50 as shown in FIG. 12A. When the piston 43 supported on the piston rod 40 is moved forward (to the left as viewed in FIG. 12A), the first straight guide section 52 corresponding to the clamping angular position A moves relative to the guide pin 54, the piston rod 40 moves slightly forward, i.e., away from the clamping position A where the clamping arm 41 clamps the workpiece W, and the turning starting position C coincides with the guide pin 54. As the piston 43 moves further forward, the unclamping guide surface 57 engages the guide pin 54, and then the guide pin 54 moves relative to the piston rod 40 along a path having the shape of a section of a cosine curve having the center line CLB. Consequently, the piston rod 40 holding the clamping arm 41 moves axially turning from a position corresponding to the clamping angular position A to a position corresponding to the unclamping angular position B as shown in FIGS. 12B and 12C. When the piston rod 40 starts turning at the turning starting point C, the unclamping guide surface 57 is inclined at a large angle to the direction of a thrust applied to the piston rod 40, the thrust is converted into a corresponding torque and the piston rod 40 starts turning quickly. If the path between the turning starting point C and the turning terminating point D has the shape of a section of a cosine curve in the range of 0° to 180° as shown in FIG. 14, torque will be produced gradually as the piston rod 40 is moved forward and the piston rod 40 will gradually start turning and, consequently, it takes a long time for the piston rod 40 to turn from the position corresponding to the clamping angular position A to the position corresponding to the unclamping angular position B.

As the turning terminating point D approaches the guide pin 54, a rotational inertial force of the clamping arm 41 urges the piston rod 40 for movement in the unclamping direction. Since the mass of the clamping arm 41 is determined so that the thrust overcomes the inertial force, the guide pin 54 moves relative to the piston rod 40 along the unclamping guide surface 57, i.e., along a path having the shape of a section of a cosine curve. The torque produced by the thrust decreases gradually as the piston rod 40 moves forward and the torque disappears when the turning terminating point D coincides with the guide pin 54 as shown in FIG. 12(C). Subsequently, the guide pin 54 moves smoothly relative to the piston rod 40 from the turning terminating point D into the second straight guide section 53 and the piston rod 40 stops after moving slightly forward at the unclamping angular position B.

Figure 12D:
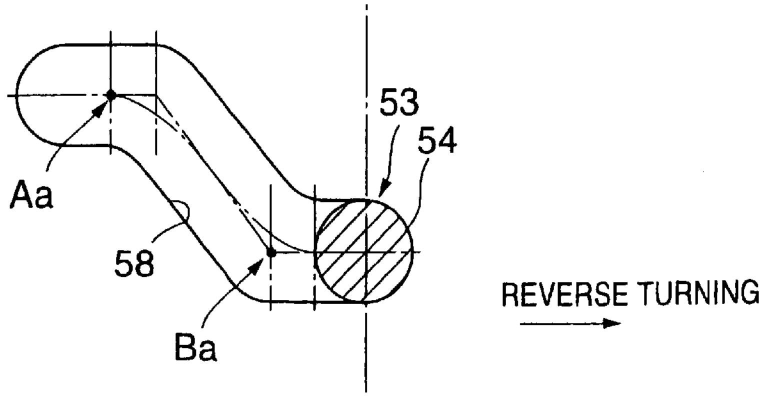

When the working fluid is supplied through the hole 21*a,* the first connecting passage 22*a* and the connecting passage 14 into the front chamber P1 in a state where the piston rod 40 is at a position corresponding to the unclamping angular position B as shown in FIG. 12D, the clamping guide surface 58 moves along the guide pun 54, the guide pin 54 moves relative to the piston 40 along the path represented by the center line CLA, and the clamping arm 41 is turned from the unclamping angular position B toward the clamping angular position A. First, the piston rod 40 moves slightly backward at an angular position corresponding to the unclamping angular position B, the guide pin 54 moves relative to the piston rod 40 to a position indicated by a two-dot chain line in FIG. 12C and coinciding with the turning starting point Ba of the center line CLA of the clamping guide section 58A. Then, the guide pin 54 moves relative to the piston rod 40 along the clamping guide surface 58. Thus, the piston rod 40 starts turning quickly at the turning starting point Ba, the torque acting on the piston rod 40 decreases gradually as the guide pin 54 approaches the turning terminating point Aa, the torque disappears upon the arrival of the guide pin 54 at the turning terminating point Aa. Then, the guide pin 54 moves relative to the piston rod 40 along the first straight guide section 52 and the clamping arm 41 clamps a workpiece W.

Figure 13:
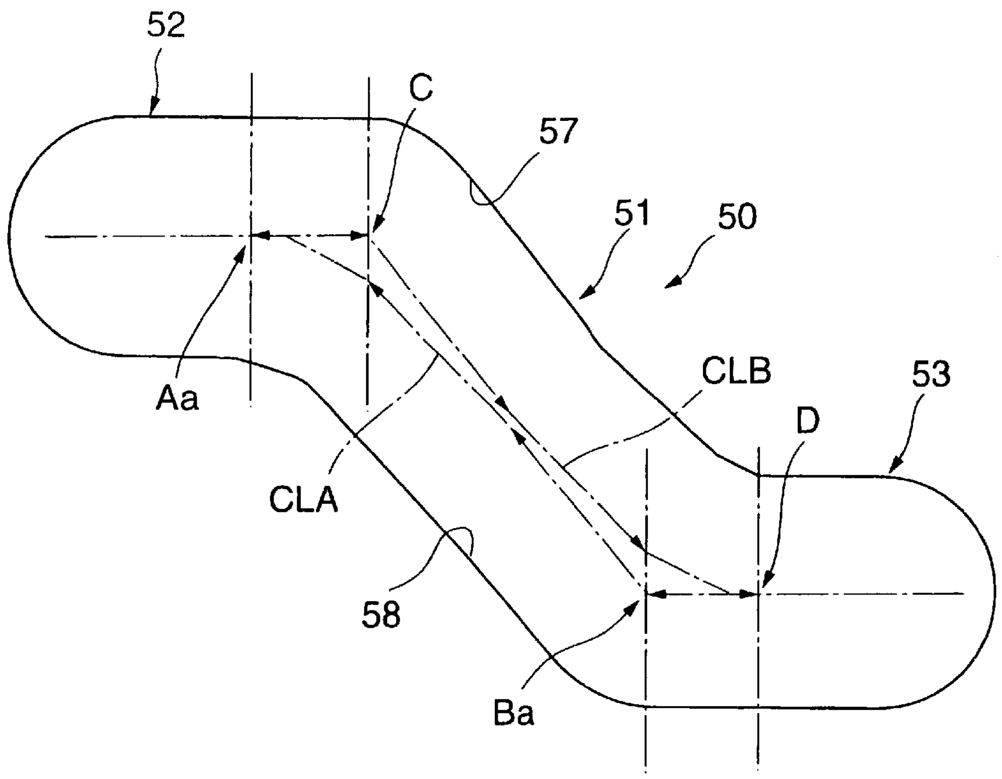
FIG. 13 is a development of a modification of the guide groove employed in the rotary clamping cylinder actuator shown in FIG. 8.

Although the path of the guide pin 54 guided by the guide groove 50 between the turning starting point and the turning terminating point when the piston rod turns in the normal direction and the path of the guide pin 54 guided by the guide groove 50 between the turning starting point and the turning terminating point when the piston rod 40 turns in the reverse direction has the shape of a section of a cosine curve in the second embodiment, each of those paths may have the shape of a section of a sine curve. The clamping guide surface and the unclamping guide surface of the guide groove may be formed so that a section of the path of the guide member near the turning terminating point has the shape of a section of a sine curve or a cosine curve, and a section of the same path between the turning starting point and the turning terminating point is straight and inclined at a predetermined angle to the direction of the thrust. Although it is preferable, in view of smoothly moving the guide pin, that the path of the guide pin leading to the turning terminating point has the shape of a section of a cosine or sine curve, the path may have the shape of a successively bent line consisting of successive line segments as shown in FIG. 13. The inclination of the successively bent center line shown in FIG. 13 to the axis of the piston rod decreases gradually toward the turning terminating point and the line segment connected to the turning terminating point is parallel to the axis of the piston rod. Therefore, when the guide pin moves relative to the piston rod along the pass having the bent center line, the torque resulting from the thrust applied to the piston decreases gradually and disappears at the turning terminating point Aa (D). At the turning starting point Ba (C), the inclination of the bent center line to the axis of the piston rod is large and hence a thrust applied to the piston rod is converted immediately into a corresponding torque.

As apparent from the foregoing description, according to the present invention, the clamping arm turns from the clamping angular position to the unclamping angular position and moves smoothly in the axial direction at the unclamping angular position. Therefore, as compared with the guide member and the piston rod of the conventional rotary clamping cylinder actuator in which the unclamping angular position is determined by the helical guide section, the guide member and the piston rod of the rotary clamping cylinder actuator are less subject to the effect of the rotational inertial force of the clamping arm, and shocks that may be exerted on the guide member and the piston rod when the clamping arm is stopped at the unclamping angular position can be reduced. The turning angle of the clamping arm can be determined independently of the stroke of the piston.

The normal and the reverse turning of the piston rod can be quickly started at the turning starting points and hence the time necessary for turning the clamping arm can be reduced. Since the torque resulting from the thrust can be reduced to zero at the turning terminating point, the turning of the clamping arm can be very quietly stopped.

Since the distance between the axis of the piston rod and the outer circumference of the piston is greater than that between the axis of the piston rod and the inner circumference of the piston, the piston rod turns relative to the piston. The resistance to the turning of the piston rod relative to the piston is less than that to the turning of the piston rod that turns together with the piston. Therefore, the piston rod can be turned by a low working pressure applied thereto.

Although the invention has been described in its preferred embodiments with a certain degree of particularity, obviously many changes and variations are possible therein. It is therefore to be understood that the present invention may be practiced otherwise than as specifically described herein without departing form the scope thereof.

What is claimed is:

1. A rotary clamping cylinder, actuator comprising:

a cylinder;

a piston provided in the cylinder;

a front end cover attached to a front end of the cylinder;

a rotatable piston rod provided in an outer surface thereof with a guide groove and contained in the cylinder so as to project to outside through the front end cover and to be moved axially between a position corresponding to a clamping angular position and a position corresponding to an unclamping angular position by the piston, said piston rod being coupled to the piston so as to be turnable relative to the piston;

a guide member attached to one of the cylinder and the piston and engaged in the glide groove of the piston rod so as to be movable relative to the piston rod in directions parallel to axis of the piston rod; and a clamping arm attached to a fine end of the piston rod, said clamping arm being capable of being turned together with the piston rod between the clamping angular position and the unclamping angular position;

wherein the guide groove has an oblique guide section extending oblique to the axis of the piston rod to turn the piston rod, a first straight guide section connected to one end of the oblique guide section and corresponding to the clamping angular position, and a second straight guide section connected to the other end of the oblique guide section and corresponding to the unclamping angular position, and the oblique guide section and the second straight guide section are so connected that a center of the guide member moves substantially along a circular arc when the guide member moves relative to the piston rod from the oblique guide section to the second straight guide section corresponding to the unclamping angular position.

2. The rotary clamping cylinder actuator according to claim 1, wherein the oblique guide section and the second straight guide section corresponding to the unclamping angular position of the guide groove are connected by an arcuate connecting section having a shape of a circular arc, a clamping guide surface of the oblique guide section that engages the guide member when the piston rod is thrust by a piston toward the clamping angular position, and one guide surface of the second straight guide section corresponding to the unclamping angular position are connected by an arcuate connecting surface, and the center of the guide member moves along a circular arc when the guide member moves relative to the piston along the arcuate connecting surface in the arcuate connecting section.

3. The rotary clamping cylinder actuator according to claim 2, wherein, in the arcuate connecting section, an unclamping guide surface of the oblique guide section that engages the guide member when the piston rod is thrust toward the unclamping angular position by the piston, and another guide surface of the second straight guide section corresponding to the unclamping angular position are connected by an arcuate connecting surface, and the center of the guide member moves along a circular arc when the guide member moves relative to the piston rod along the arcuate connecting surface.

4. The rotary clamping cylinder actuator according to claim 1, wherein the guide groove has a semicircular cross section, the guide member is a ball capable of rolling along the guide groove, and the ball is supported for rolling in a bearing member.

5. The rotary clamping cylinder actuator according to claim 1, wherein the piston rod turns between a first angular end position and a second angular end position, the piston rod turns from the first angular end position toward the second angular end position for normal turning and turns from the second angular end position toward the first angular end position for reverse turning, and the opposite guide surfaces of the guide groove serve as a first guide surface for normal turning and a second guide surface for reverse turning, respectively, and guide the guide member so that the guide member moves relative to the piston rod along different paths in the guide groove while the piston rod turns for normal turning and reverse turning, respectively, and wherein the first guide surface for normal turning and the second guide surface for reverse turning are formed in shapes that guide the guide member so that the guide member moves relative to the piston rod along a path inclined to the axis of the piston rod to convert a thrust applied to the piston rod into a torque that turns the piston rod from the first angular end position toward the second angular end position, moves relative to the piston rod along a path having a shape of a section of a sine curve or a cosine curve in a final stage of movement of the piston rod, and moves relative to the piston rod so as not to produce any torque at the second angular end position.

6. The rotary clamping cylinder actuator according to claim 5, wherein the first guide surface for normal turning and the second guide surface for reverse turning are so formed that the guide member moves relative to the piston rod along a path having a shape selected from a group consisting of a section of a sine curve and a cosine curve from a turning starting point toward a turning terminating point.

7. The rotary clamping cylinder actuator according to claim 6, wherein the first and the second guide surface are formed such that a tangent to a curve selected from a group consisting of the sine and the cosine curve at the turning terminating point is parallel to the axis of the piston rod and a tangent to said curve selected from said group consisting of the sine and the cosine curve at the turning starting point is inclined to the axis of the piston rod.

8. The rotary clamping cylinder actuator according to claim 5, wherein the guide groove is so formed that the turning starting point on the path of the guide member for normal turning is separated axially by a distance from the turning terminating point on the path of the guide member for reverse turning, and the turning terminating point on the path of the guide member for normal turning is separated axially by a distance from the turning starting point on the path of the guide member for reverse turning.

9. The rotary clamping cylinder actuator according to claim 1, wherein the piston rod turns between a first angular end position and a second angular end position, the piston rod turns from the first angular end position toward the second angular end position for normal turning and turns from the second angular end position toward the first angular end position for reverse turning, opposite guide surfaces of the guide groove serve as a first guide surface for normal turning and a second guide surface for reverse turning, respectively, so that the guide member moves relative to the piston along different paths in the guide groove while the piston rod turns for normal turning and reverse turning, respectively, and the first guide surface for normal turning and the second guide surface for reverse turning are formed in shapes that guide the guide member so that the guide member moves along a path inclined to the axis of the piston rod to convert a thrust applied to the piston rod into a torque at a turning starting point, the guide member moves relative to the piston rod along a path that decreases gradually the torque produced by the thrust applied to the piston rod, and the guide member moves so as not to produce any torque at a turning terminating point.

10. The rotary clamping cylinder actuator according to claim 1, wherein a reduced portion and a shoulder are formed in the piston rod by reducing a diameter of an end portion of the piston rod, the reduced portion of the piston rod is fitted in a center bore formed in the piston, a retaining member for retaining the piston on the reduced portion of the piston rod is attached to a free end of the reduced portion of the piston rod so that the piston is retained between the shoulder of the piston rod, and the retaining member with an axial gap between the piston and the shoulder of the piston rod, and the piston rod is turnable relative to the piston.

11. The rotary clamping cylinder actuator according to claim 1, wherein a gap between a reduced portion of the piston rod and a wall defining the center bore of the piston is sealed with a sealing member.

12. The rotary clamping cylinder actuator according to claim 1, wherein a gap between the reduced portion of the piston rod and a wall defining the center bore of the piston is sealed with a sealing member.

13. The rotary clamping cylinder actuator according to claim 2, wherein the guide groove has a semicircular cross section, the guide member is a ball capable of rolling along the guide groove, and the ball is supported for rolling in a bearing member.

14. The rotary clamping cylinder actuator according to claim 3, wherein the guide groove has a semicircular cross section, the guide member is a ball capable of rolling along the guide groove, and the ball is supported for rolling in a bearing member.

15. The rotary clamping cylinder actuator according to claim 6, wherein the guide groove is so formed that the turning starting point on the path of the guide member for normal turning is separated axially by a distance from the turning terminating point on the path of the guide member for reverse turning, and the turning terminating point on the path of the guide member for normal turning is separated axially by a distance from the turning starting point on the path of the guide member for reverse turning.

16. The rotary clamping cylinder actuator according to claim 6, wherein the guide groove is so formed that the turning starting point on the path of the guide member for normal turning is separated axially by a distance from the turning terminating point on the path of the guide member for reverse turning, and the turning terminating point on the path of the guide member for normal turning is separated axially by a distance from the turning starting point on the path of the guide member for reverse turning.

17. The rotary clamping cylinder actuator according to claim 10, wherein a gap between the reduced portion of the piston rod and a wall defining the center bore of the piston is sealed with a sealing member.

18. The rotary clamping cylinder actuator according to claim 10, wherein the guide member is a steel ball, and the steel ball is supported for rolling in a bronze bearing member.

19. The rotary clamping cylinder actuator according to claim 11, wherein the guide member is a steel ball, and the steel ball is supported for rolling in a bronze bearing member.

* * * * *